United States Patent [19]

Jenkins

[11] Patent Number: 4,634,449
[45] Date of Patent: Jan. 6, 1987

[54] OPAQUE TINTING PROCESS FOR CONTACT LENS

[75] Inventor: Evan J. Jenkins, Shepperton, United Kingdom

[73] Assignee: International Hydron Corporation, Woodbury, N.Y.

[21] Appl. No.: 778,576

[22] Filed: Sep. 20, 1985

[51] Int. Cl.$^4$ ............................................. D06P 5/00
[52] U.S. Cl. ........................................ 8/507; 8/621; 8/651
[58] Field of Search ............................. 8/507, 651, 624

[56] References Cited

U.S. PATENT DOCUMENTS

| | | | |
|---|---|---|---|
| 3,476,499 | 11/1969 | Wichterle | 8/507 |
| 3,679,504 | 7/1972 | Wichterle | 156/62 |
| 4,157,891 | 6/1979 | Tanaka et al. | 8/507 |
| 4,252,421 | 2/1981 | Foley | 8/507 |
| 4,447,474 | 5/1984 | Neefe | 427/164 |
| 4,460,523 | 7/1984 | Neefe | 264/1.9 |
| 4,468,229 | 8/1984 | Su | 8/507 |
| 4,472,327 | 9/1984 | Neefe | 264/1.9 |
| 4,494,954 | 1/1985 | Suminoe et al. | 8/507 |
| 4,518,390 | 5/1985 | Rabenau et al. | 8/507 |
| 4,582,402 | 4/1986 | Knapp | 351/162 |

FOREIGN PATENT DOCUMENTS

122771 10/1984 European Pat. Off. ............... 8/507

Primary Examiner—A. Lionel Clingman
Attorney, Agent, or Firm—Vincent P. Pirri

[57] ABSTRACT

A method is provided for tinting a hydrogel contact lens whereby the tinting effect is not appreciably affected by the underlying color of the iris of the wearer's eyes.

23 Claims, 8 Drawing Figures

OPAQUE TINTING PROCESS FOR CONTACT LENS

BACKGROUND OF THE INVENTION

This invention relates to a process for tinting or coloring a hydrogel contact lens or other ophthalmic prosthetic device. The process is especially suitable for practice with the lens tinting procedure and lens mounting apparatus described in U.S. Pat. No. 4,518,390 as more fully discussed hereinafter.

Contact lenses can be tinted for cosmetic appearance as well as to reduce light transmission thereby providing the wearer with increased visual comfort. It is, of course, important that the tinted, or colored, lens impart a natural appearance to the wearer's eye. A natural-appearing soft contact lens should have a clear central area, a tinted intermediate area and a clear outer area so that the tinted portion will not cover the sclera of the eye. Moreover, the central portion of the lens should be untinted to permit maximum light passage into the eye interior.

Apart from the foregoing considerations, the nature of the tinting procedure imposes still other requirements if a technically successful and cost-efficient tinting operation is to be realized. It is important that the worker not handle the lens directly with his or her fingers or fingertips because the minute amounts of oil contained on the worker's fingertips will prevent the dye from being accepted or absorbed evenly by the lens. If the worker uses gloves, manipulation of the lens during the tinting procedure can be rendered difficult. If the worker uses tweezers and manually mounts the lens on a fixture, lens production can be slow and accuracy in the mounting may be compromised.

As suggested above, it is important that the tinted annular area of the lens, and correspondingly the clear central portion, be precisely defined and accurately located. Even slight fuzziness or running of dye colors into otherwise uncolored areas of the lens will be immediately apparent. Fuzziness or tint runs will necessitate the rejection of the finished lens product.

By way of achieving a precise and economical procedure for tinting a contact lens meeting the foregoing criteria, U.S. Pat. No. 4,518,390 provides a lens tinting method employing a lens mounting apparatus comprising a tube having a body portion and a closed end portion defined partially by a lens masking structure in communication with the tube body. Suitably treated water, e.g., physiological saline, is placed in the tube to form a column of liquid. The lens to be tinted is dropped into this liquid column and as it falls through the liquid, attains a state of dynamic equilibrium, with the lens convex side down. Further, the hydraulic forces acting on the lens as it passes through the column of liquid will cause the lens to center itself with respect to the interior of the tube body. Thus, as the lens reaches the bottom of the tube, it will be centered as it comes to rest upon the lens mask structure formed at the tube bottom. In one embodiment, this mask structure includes two coaxial seats defining an open annular lens area therebetween. It is this annular area which is to be tinted.

When the lens is centered on the mask, a mandrel device is inserted into the tube. This mandrel has a nose which substantially conforms to the concave surface of the lens. Thus, when the mandrel engages the lens concave side, the convex side of the lens is pushed into firm engagement with the mask structure. The mandrel is then locked within, and upon, the tube. As the mandrel passes through the liquid column it also will be centered due to hydraulic forces acting thereon which produce a state of dynamic equilibrium. Thus, upon engaging the lens, the mandrel is also centered relative to the tube body.

Thereafter, the fixture is inverted and the liquid column in the tube drained away. Next, a tinting medium or dye solution is introduced into a chamber formed in the tube bottom proximate the mask structure. This tinting medium is exposed only to the unmasked portion of the lens and will permeate the lens material of the unmasked portion to provide the desired tint.

The foregoing lens-tinting procedure and apparatus employed therein provides generally excellent results with lenses to be worn by individuals having light colored eyes. For example, a gray iris can be made to take on the color of almost any tinted lens. However, for the estimated seventy percent of the world's population with dark irises, i.e., brown eyes, a change in color is obtained only with the darkest of lens tints as the underlying color of the iris tends to dominate the overall color effect. Such eyes can only be made to appear darker, not lighter.

SUMMARY OF THE INVENTION

The present invention provides a method for tinting a hydrogel contact lens whereby the visual effect of the tint is not appreciably influenced or modified by the color of the wearer's eyes.

In accordance with this method, a selected area of a hydrogel contact lens is first rendered opaque and only then is the opaqued area tinted employing known lens tinting techniques, e.g. those described in U.S. Pat. Nos. 4,252,421 and 4,447,474 and particularly that of U.S. Pat. No. 4,518,390 referred to above, or the preferred tinting procedure employing a water-soluble lenco ester of a vat dye as hereinafter described. The initial opaquing step can be achieved using a variety of chemical techniques such as those described in U.S. Pat. No. 3,679,504.

The term "hydrogel" is descriptive of any water absorptive, optically clear polymeric material which is suitable for the fabrication of a contact lens. Illustrative of such polymers are the water swellable, water-insoluble shape-retaining hydrogels disclosed in U.S. Pat. Nos. 2,976,576; 3,220,960; 3,822,089; 4,208,364; 4,208,365; and, 4,517,139, among others. Contact lenses formed from such materials, the so-called "soft" lens variety, become soft and pliable upon the absorption of water and in the hydrated state, are relatively comfortable to wear. By employing the opaquing process of this invention, selected areas of such lenses can be subsequently tinted to provide a variety of desired color effects, whether for cosmetic reasons or otherwise, which are unimpaired by, and independent of, the color of the wearer's eyes.

DESCRIPTION OF THE PREFERRED EMBODIMENTS

A. The Lens Mounting Apparatus

Figures 1, 6, 7:
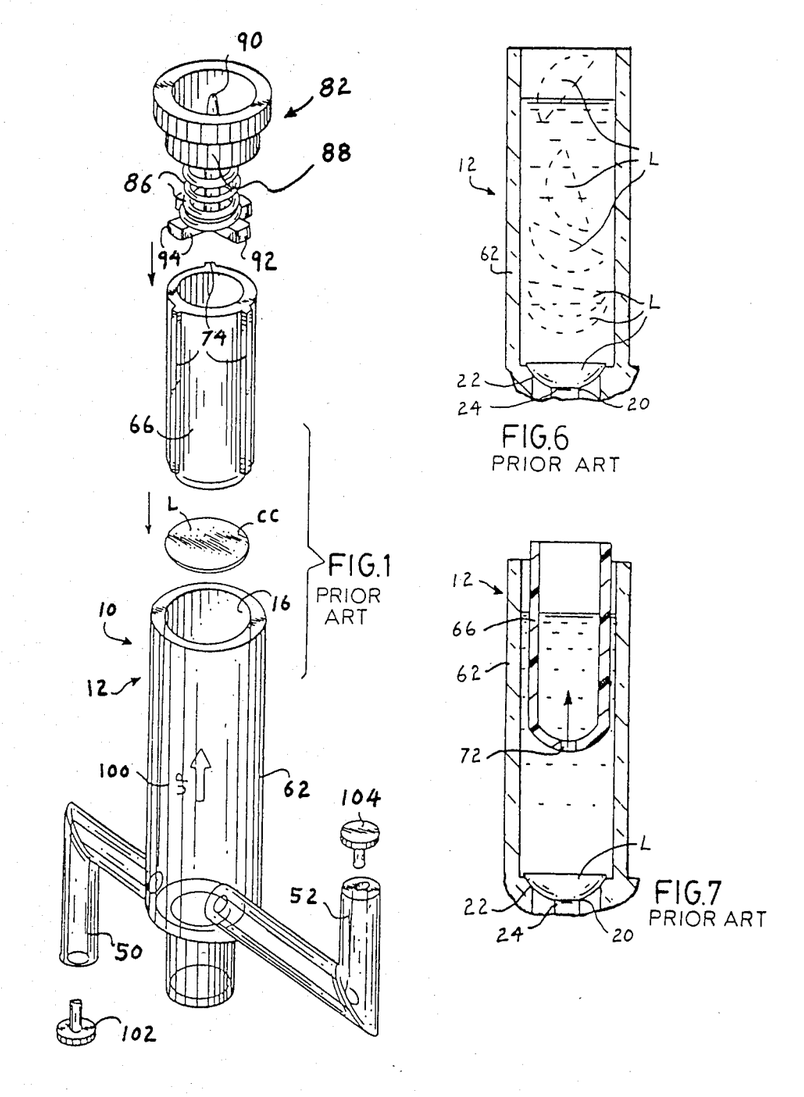
FIG. 1 is an exploded view of a known lens mounting apparatus employed in a preferred embodiment of the lens tinting method of this invention.
FIG. 6 is a fragmentary sectional view showing the motion of a contact lens as it passes through a column of liquid contained within a tube portion of the fixture.
FIG. 7 is a fragmentary sectional view similar to FIG. 6 and showing action of the liquid as a mandrel member is inserted into the tube.
Figure 2:
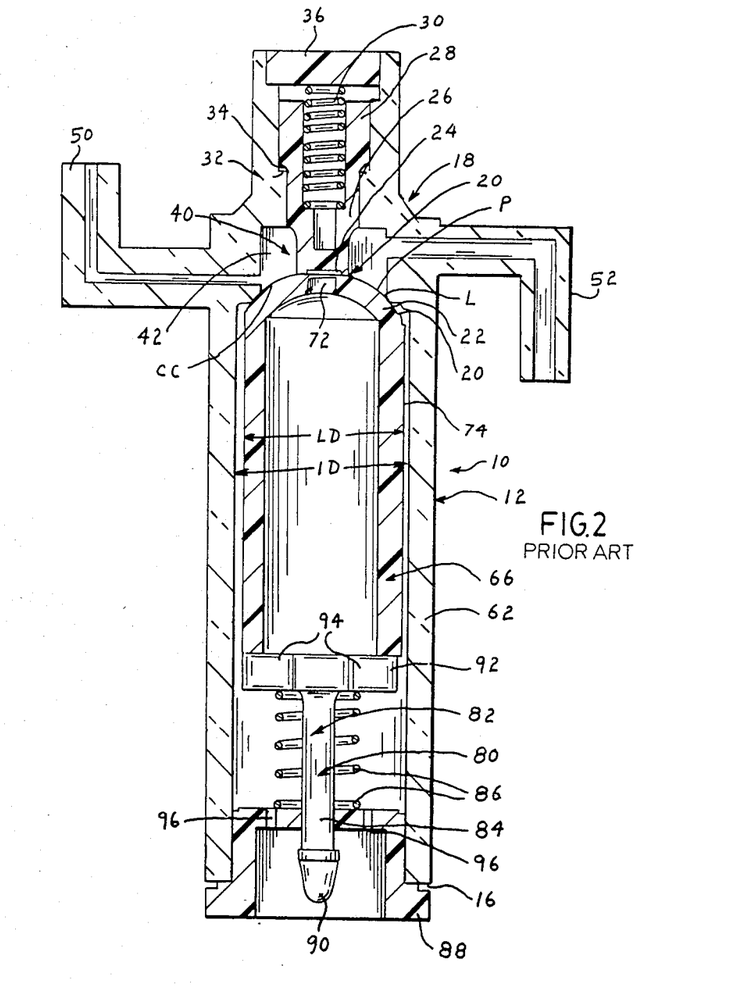
FIG. 2 is a sectional view showing the apparatus of FIG. 1 in its assembled condition and inverted.
Figure 3:
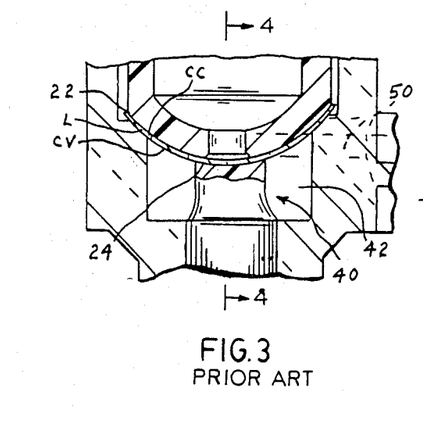
FIG. 3 is a fragmentary sectional view showing in further detail the masking portion of the apparatus in a position as per FIG. 1, and inverted from that shown in FIG. 2.
Figure 4:
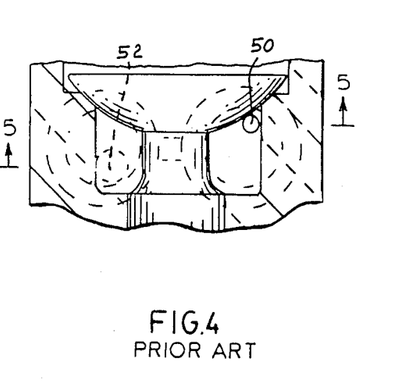
FIG. 4 is a fragmentary sectional view taken substantially in the plane of line 4—4 in FIG. 3.
Figure 5:
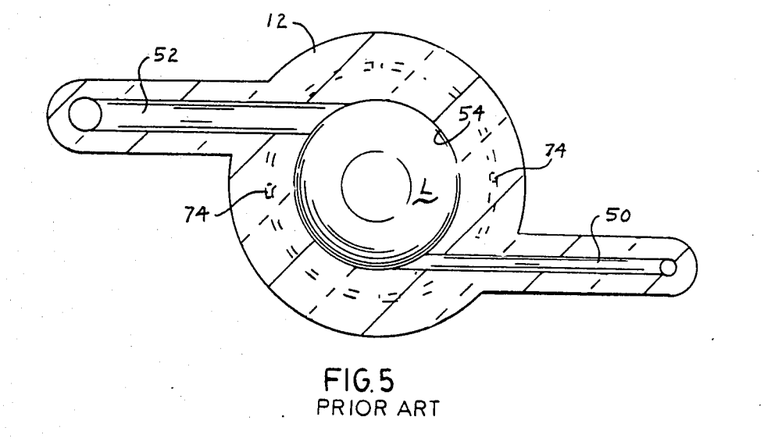
FIG. 5 is a sectional view taken substantially in the planes of lines 5—5 in FIG. 4.

Turning first to FIGS. 1 and 2, there is shown a lens mounting apparatus 10 in accordance with U.S. Pat. No. 4,518,390 which is especially well suited for use in the practice of the opaque tinting process herein. In general, apparatus 10 can be considered to include an elongate tube 12 into which a hydrogel contact lens L can be dropped or otherwise inserted. One end 16 of this tube 12 is generally open while the other end 18 is closed by a specially designed masking structure.

The tube-closing structure 18 includes a lens mask structure 20. Here, this mask structure includes an outer, annular seat or mask portion 22, and spaced apart therefrom but coaxial therewith; an inner seat or mask portion 24. To provide desired resiliency in supporting, engaging, and masking portions of contact lens L, this inner seat or mask 24 is formed on nose 26 of a plunger 28 which is biased, as by a spring 30, toward lens L. Thus, the spring biasing means 30 urges the inner mask seat 24 toward lens L and into firm contact therewith. Plunger motion toward lens L is halted or restrained by a shoulder 32 formed on the bottom portion of tube 12; a mating shoulder 34 is formed on the plunger 28. Spring 30 and plunger 28 are retained within the tube structure 12 by any convenient device such as a cap or plug 36.

A chamber 40 is provided at the closed end of tube 12 proximate mask structure 20 for sequentially providing liquid opaquing and tinting media to the unmasked portions P of lens L as hereinafter more fully explained. Chamber 40 includes a cylindrical cavity 42 surrounding plunger nose 26 and inner mask seat 24, and disposed inwardly of the outer mask portion 22.

To admit liquid opaquing medium, and thereafter, liquid tinting medium to chamber cavity 42, inlet and outlet ports 50 and 52 are provided as shown in FIGS. 1, 2, 4 and 5. These media are urged to swirl through chamber 40 and past lens L by orienting inlet and outlet ports 50 and 52 substantially tangential to wall 54 of cylindrical cavity 42. To encourage the removal of air bubbles and the accumulation of any preliminary solution squeezed out of the lens during lens capture, inlet port 50 is smaller than outlet port 52, and inlet port 50 is located tangentially as noted above, and also at an axially upper position relative to outlet port 52.

Tube 12 includes an elongate body portion 62 capable of retaining a column of liquid. The diameter of body portion 62 is just slightly greater than the diameter of lens L. Preferably, the internal diameter, ID, of tube body portion 62 is approximately 2 mm. larger than that of the lens diameter, LD. The height of the column of liquid and the height of body portion 62 are from one to three times the lens diameter, LD, and preferably from two and one-half times lens diameter LD. When lens L is dropped into liquid-filled tube 12, it descends through the liquid and attains a state of dynamic equilibrium, with a lens convex side CV down, as shown in FIG. 6. As the lens falls downwardly through the column of liquid, the hydraulic forces acting on the lens will operate to center the lens with respect to the tube. Thus the lens will be in the desired orientation and will be properly centered as it engages mask means 20 for the opaquing and tinting operations to follow.

To engage and secure lens L against the mask means or structure 20 in a position to be contacted by the opaquing and tinting media, a mandrel 66 is inserted into tube 62 as shown in FIGS. 2 and 7. This mandrel 66 is provided with a rounded nose portion 68 adapted to engage the concave side CC of lens L.

So that the column of liquid will not overflow the open top 16 of the tube 12, mandrel 66 is hollow, and a port or hole 72 is formed in mandrel nose 68 to permit liquid to flow into the mandrel interior as illustrated in FIG. 7. This permits mandrel 66 to sink into the liquid in the tube means with a controlled motion, the mandrel being centered by the hydraulic forces in the same manner as was lens L. In addition, external spacer ribs 74 are formed on the outside of mandrel 66 so as to space mandrel 66 from the tube body wall and permit liquid to flow between mandrel 66 and the tube body wall thus further enhancing the centering action.

When mandrel 66 has been fully inserted into tube 12, a mandrel lock mechanism 80 is inserted into tube 12 to force mandrel 66 against lens L and force lens L against mask structure 20. As illustrated in FIGS. 1, 2, 3 and 4, this locking mechanism 80 takes the form of a plunger 82 which is provided with a stem 84 surrounded by a compression spring 86. A lock cap 88, which can conveniently be of the plug type, is secured to plunger stem 84; here, plunger stem 84 is provided with an enlarged nose 90 to prevent loss of cap 88 from stem 84.

It will be noted that plunger 82 is provided with an enlarged base 92 provided with several cut-away formations 94. Further, cap 88 is provided with several drain holes 96. Thus, when the assembled tube and mandrel arrangement are inverted from the initial or assembly position shown in FIG. 1 to the operating position shown in FIGS. 2 and 8, the column of liquid will drain from the tube.

B. The Opaquing Procedure

Figure 8:
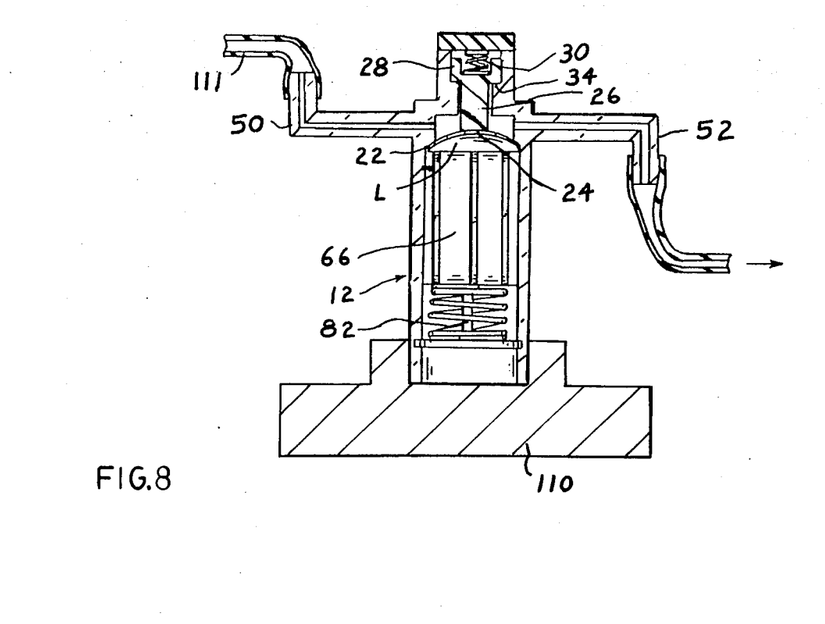
FIG. 8 is a side elevational view of the fully assembled lens mounting apparatus of FIGS. 1-7 showing lens L properly centered therein and ready for the opaquing and tinting operations of this invention.

As shown in FIG. 8, the fully assembled lens mounting apparatus of FIGS. 1-7 with its properly centered hydrogel contact lens L is set within a stand 110. Port plugs 102 and 104 (FIG. 1) have been replaced with flexible inlet and outlet tubes 111 and 112 fitted to inlet port 50 and outlet port 52, respectively. Tubes 111 and 112 are each provided with a clamp or other device to control the flow of liquid therethrough. The lens mounting apparatus is filled to an appropriate height with a receiving or preparatory liquid such as physiological saline which insures that the hydrogel lens will be maintained in a sterile and hydrophilic condition. The clamps are released to fill tubes 111 and 112 with liquid thereby expelling any air bubbles. The apparatus is again filled with liquid with removal of any air bubbles as previously described.

The lens to be opaqued and thereafter tinted is picked up by tweezers or some other clean device and is deposited in the receiving liquid and allowed to sink freely toward the closed end of the tube assembly. As it drops, the lens will orient and center itself as shown in FIG. 6, and will finally come to rest on mask structure 20 as shown in FIGS. 6 and 7, not only with the convex side down, but properly centered relative to mask structure 20. Thereafter, mandrel 66 is inserted into tube 12. The mandrel will also center itself and mandrel nose 68 will engage the concave side CC of the lens L. Fluid flows in the interior portion of mandrel 66 through port 72, as explained previously so as to permit mandrel 66 to sink into the lens-engaging position and to avoid overflow and spillage. Finally, in assembling the device, mandrel locking assembly 82 is thereafter inserted into the open top 16 of tube 12. By this action, mandrel 66 is pressed into firm engagement with the lens L and lens L is pressed into firm engagement with both outer mask 22 and inner mask 24 of the masking structure 20. It will be recalled that inner mask 24 can be displaced slightly by this mandrel forcing action against the action of plunger biasing spring 30.

The completely assembled device with the captured lens is now visually inspected to make certain that lens L has been properly seated and centered. To this end, tube 12 and other parts of the assembly are preferably formed of transparent plastic or other suitable materials. However, mandrel 66 is preferably formed of opaque plastic so as to enable the operator to better view lens L. If the lens has not been properly located and seated, mandrel locking mechanism 82 and mandrel 66 are removed, and the lens is then removed. The lens is then re-dropped and the mechanism is reassembled as before. If the lens has been properly captured and secured, plugs 102 and 104 are removed to drain the preparatory fluid from chamber 40. Next the entire assembly or fixture is inverted into the position shown in FIGS. 2 and 8. As explained above, this inversion motion permits the fluid column on the side of the lens opposite the tinting chamber 40 to be drained from the assembled fixture.

Preferably, the lens opaquing of this invention is carried out at ambient temperature but temperatures above or below this level can be employed provided they do not impede the chemical mechanisms involved in the opaquing procedure. Opaquing medium, advantageously in the form of a precipitatable metal salt as more fully discussed below, is introduced into chamber 40 through inlet port 50 of the inverted lens mounting assembly. Because of the size and location of inlet port 50 and outlet port 52 described above, the opaquing medium enters chamber 40 tangentially to the walls thereof with a low pressure swirling action. This liquid swirling action ensures an even application of the opaquing medium to the unmasked area of the lens. Also this action causes any bubbles of air to be removed from convex surface CV of lens L which constitutes the temporary bottom surface of chamber 40. These air bubbles are then swept out through the outlet port. Removal of air bubbles in this way is highly desirable because the presence of bubbles on the surface of lens L can cause voids or irregularities in the finished tinted lens.

It will also be noted that any preparatory solution on lens L which has been squeezed out of the lens by the locking or securing action of the mandrel 66, will also be swept out of chamber 40. If this solution were allowed to accumulate in chamber 40, the opaquing medium might be diluted and an uneven opaquing action might result.

A variety of opaquing materials, e.g., those described in U.S. Pat. No. 3,476,499 referred to above, can be used with good results. For example, metallic silver, gold, and platinum, each of which can produce an opaque effect in a hydrogel lens, can be precipitated from solutions of their salts within the hydrogel by means of hydrazine, reducing sugars, or formaldehyde, respectively. Opaquing precipitates can also be formed by reacting suitable impregnating and precipitating agents with the reaction product then being selectively exposed to light. A particularly useful impregnating agent is silver nitrate which will react with a halide salt, e.g., sodium chloride, to precipitate the corresponding silver halide salt which is light sensitive. Thus, after a suitable period of exposure to light, the silver halide will form an opaque precipitate within the unmasked portion of the hydrogel lens which is resistant to loss by tearing or the wiping action of the eyelids. The amounts of impregnating and precipitating agent employed, the duration of contact of these agents with the unmasked portion of the lens and the duration of exposure of the precipitated metal salt are not critical and are readily determined by those skilled in the art employing known and relatively simple procedures.

In preparation for exposure to a source of light (or other actinic radiation), the lens is removed from the mounting apparatus, placed in a transparent vial partially filled with physiological saline and the vial is exposed to light. The resulting selectively opaqued lens is then ready for the tinting procedure described below.

The opaquing materials herein are physiologically inert. They cannot chemically irritate the eye nor can they actually come in contact with it in significant amounts as they are unable to migrate in the hydrogel material.

C. The Tinting Procedure

The opaqued lens is centered in another lens mounting apparatus which is fitted out and assembled as before and the entire assembly is mounted in the inverted position as shown in FIG. 8. The tinting operations are preferably carried out at elevated temperature, e.g., at from about 50° C. to about 60° C., for overall best results.

The preferred procedure for tinting the opaqued lens comprises applying a solution of a water-soluble leuco ester of a vat dye to the lens followed by treatment with an oxidizing to regenerate the vat dye. While any leuco ester of a vat dye can be used in accordance with this invention, it is often preferred to use such dyes which impart a natural eye color appearance to the lens. In general, the useful dyes are water-soluble sulfuric acid esters of leuco vat dyes of the anthroquinone and indigoid series. Various combinations of such dyes can also be used. A more detailed description of such leuco esters of vat dyes can be found in Lubs, "The Chemistry of Synthetic Dyes and Pigments", ACS Monograph No. 127, Reinhold Publishing Corporation, 1955, pages 534 to 546 and Vankataraman, "Synthetic Dyes", Academic Press, 1952, pp. 1046–1059. A number of specific water-soluble leuco esters which may be employed in the process of the present invention are disclosed in Lubs. op. cit., pp. 538 to 546 inclusive. Commercially available dyes which can be employed herein include the following:

Solubilized Vat Blue 6, C. I. 69826

Solubilized Vat Orange 1, C. I. 59106
Solubilized Vat Brown 1, C. I. 70801
Solubilized Vat Yellow 3, C. I. 61726
Solubilized Vat Green 1, C.I. 59826

The solution of the water-soluble leuco ester of the vat dye is usually employed as an aqueous solution having a concentration of the dye of from about 0.1% to about 25% by weight. In addition to the employment of aqueous solutions, the water-soluble leuco ester of the vat dye may be dissolved in various organic solvents or mixtures of such solvents, with water.

The organic solvents, if used, should be water-miscible and of relatively high volatility for quick evaporation. These are exemplified by methanol, ethanol, propanol, butanol, acetone, dimethyl formamide, Cellosolve (ethyl ether of ethylene glycol), butyl Cellusolve (butyl ether of ethylene glycol), dimethyl sulfoxide and the like. Other assistants may be present if desired.

Color intensity is affected by such factors as concentration of the dye solution, the temperature and the duration of contact of the dye solution with the lens, the thickness of the unmasked portions of the lens to be penetrated by the dye and the degree of oxidation brought about when regenerating the original chromophore. Simple and routine experimentation can be used to determine the combination of dye concentration, temperature and contact time, and the extent of oxidation necessary to produce a desired color effect in a hydrogel lens of a given type. The oxidation step can be carried out by adding the acid and reducing agent together or sequentially in any order. Suitable acids include the mineral acids and strong organic acids such as chlorosulfonic acid, and the like. Sulfuric acid provides entirely acceptable results. In general, any known oxidizing agent can be used to regenerate the vat dye. Suitable oxidizing agents include such compounds as the peroxides, per-acids, chlorates, ferric salts, cuprous nitric acid, nitrites, chromic acid, chromates, chlorates, and the like. Sodium nitrite is advantageously used for this purpose.

Following regeneration of the vat dye to the desired state of color development, the acid is neutralized to terminate the oxidation reaction and the lens is thoroughly washed with distilled water to remove all traces of reagents and unoxidized dye.

The following example is further illustrative of the invention in which the operations and liquid media are at ambient temperature except where indicated.

EXAMPLE

The lens mounting apparatus of FIGS. 1-7 is fitted with inlet and outlet tubes for respectively conveying liquids to and away from chamber 40 and placed in a stand. Clamps are placed on the inlet and outlet tubes and the apparatus is filled with physiological saline. The clamps are released and filled with saline thereby releasing any air bubbles. The apparatus is then topped with saline and any air bubbles are removed from the interior wall thereof.

The hydrogel contact lens to be tinted is removed from its vial and dropped into the column of saline whereupon it comes to rest, concave side up, on the central portion of the mask. The mandrel is then inserted in the apparatus and locked under spring tension against the concave surface of the lens. The lens mounting assembly is then inverted and placed in a stand. Employing a syringe, 2 ml of a 2.5 weight percent aqueous solution of silver nitrate is introduced through the unclamped inlet tube into chamber 40 while the terminal end of the clamped outlet tube is placed within a beaker or other liquid-receiving vessel. The silver nitrate solution is permitted to remain in contact with the unmasked portions of the lens for from 12 seconds or less to 240 seconds or more depending upon the intensity of opaqueness desired. Thereafter, 20 ml of physiological saline is introduced through the unclamped inlet tube into chamber 40. Reaction of the silver nitrate and sodium chloride component of the saline causes the formation of a precipitate of silver chloride which, when exposed to light, releases metallic silver, the actual opaquing material. The lens is removed from the apparatus, placed in a lens vial half-filled with saline and the vial with its lens are placed in close proximity to a neon lamp for at least about 8 hours with the result that the opaque tint appears as a light beige color.

The tinted lens assembled in another lens mounting apparatus and equipped with inlet and outlet tubes as before is inserted in a stand in the inverted position as in FIG. 8. The stand is associated with a heater (not shown) which is capable of maintaining the lens mounting apparatus and its contents at an approximately constant temperature, in this case, about 50° C., to accelerate the dyeing procedure. Once the lens mounting assembly has attained this temperature, a syringe is used to inject an aqueous solution of the water-soluble leuco ester of the selected vat dye. After the desired period of dye solution contact has elasped, the clamp on the outlet tube is released to drain excess dye solution, the syringe is removed from the inlet tube and another syringe is inserted in the inlet tube and used to inject a sulfuric acid solution of sodium nitrite oxidizing agent into chamber 40. Following the desired period of contact between the dye-impregnated lens and the oxidizing agent, the lens is removed from its mounting apparatus and placed in a solution of sodium bicarbonate which neutralizes the sulfuric acid and halts any further oxidation of dye. The opaqued, tinted lens is then placed in distilled water for fifteen minutes or so, removed therefrom and placed in saline and then autoclaved. Thirty minutes following autoclaving, the pH of the lens is checked to see that it meets specifications (pH 5.50-8.50).

It is anticipated that those skilled in the art may devise various alternatives or modifications to the disclosed embodiment, once possessed of the present disclosure. As such this disclosure is not intended to limit the invention, but rather to illustrate a preferred embodiment, the spirit and scope of the invention being defined by the claimed appended hereto.

What is claimed is:

1. A method of tinting a hydrogel contact lens such that the visual effect of the tint is not appreciably influenced or modified by the color of the wearer's eyes which comprises:
   (a) opaquing selected portion(s) of said lens with an opaquing medium which is a metal salt which undergoes reaction with a precipitating agent to provide a metallic opaquing material selected from the group consisting of silver, gold and platinum; and,
   (b) tinting only the opaqued portion(s) of the lens wherein said tinting is carried out by exposing the opaqued portion(s) of said lens to a solution of a water-soluble leuco ester of a vat dye whereby said dye penetrates said opaqued portion(s) of the lens and thereafter the dye is oxidized to regenerate the vat dye.

2. The method of claim 1 wherein opaquing step (a) is carried out using a tube-like structure which is closed at one end by structure which includes mask means and which is open at the other end, the method comprising the steps of; orienting the tube-like structure in a first position with the open end upward; adding a fluid column to the interior of said tube structure; dropping the lens to be tinted into the fluid in the tube, and permitting the lens to sink through the fluid column, so as to cause the lens to orient and center itself relative to the tube, permitting the oriented and centered lens to come to rest on mask structure defined in the tube bottom, inserting a mandrel member into the tube and fluid to secure the lens in place between the mandrel and the mask structure and opaquing the unmasked portion(s) of the lens.

3. The method of claim 2 wherein the metal salt is silver nitrate, the precipitating medium is a halide salt and the precipitated silver halide is sensitive to light.

4. The method of claim 3 wherein the silver halide is silver chloride which, when exposed to light, provides metallic silver as the opaquing material.

5. The method of claim 1 wherein tinting step (b) is carried out using a tube-like structure which is closed at one end by structure which includes mask means and which is open at the other end, the method comprising the steps of; orienting the tube-like structure in a first position with the open end upward; adding a fluid column to the interior of said tube structure; dropping the previously opaqued lens to be tinted into the fluid in the tube, and permitting the lens to sink through the fluid column, so as to cause the lens to orient and center itself relative to the tube, permitting the oriented and centered lens to come to rest on mask structure defined in the tube bottom, inserting a mandrel member into the tube and fluid to secure the lens in place between the mandrel and the mask structure and tinting the opaqued, unmasked portion(s) of the lens.

6. The method of claim 5 wherein the opaquing medium is a metal salt which undergoes reaction with a precipitating agent to provide a metallic opaquing material.

7. The method of claim 6 wherein the metal salt is silver nitrate, the precipitating medium is a halide salt and the precipitated silver halide is sensitive to light.

8. The method of claim 7 wherein the silver halide is silver chloride which, when exposed to light, provides metallic silver as the opaquing material.

9. The method of tinting a hydrogel contact lens such that the visual effect of the tint is not appreciably influenced or modified by the color of the wearer's eyes which comprises:
(a) providing a tube-like structure which is closed at one end by structure which includes mask means and which is open at the other end;
(b) orienting the tube-like structure in a first position with the open end upward;
(c) adding a fluid column to the interior of said tube structure;
(d) dropping the lens to be opaqued into the fluid in the tube, and permitting the lens to sink through the fluid column, so as to cause the lens to orient and center itself relative to the tube;
(e) permitting the oriented and centered lens to come to rest on mask means defined in the tube bottom;
(f) inserting a mandrel member into the tube and fluid to secure the lens in place between the mandrel and the mask structure;
(g) opaquing the unmasked portion(s) of the lens with an opaquing medium which is a metal salt which undergoes reaction with a precipitating agent to provide a metallic opaquing material selected from the group consisting of silver, gold and platinum;
(h) retaining the opaqued lens within the tube-like structure of step (a), or transferring the opaqued lens to another tube-like structure of step (a) in which case steps (b) and (f) are repeated; and,
(i) tinting the opaqued, unmasked portion(s) of the lens wherein said tinting is carried out by exposing the opaqued portion(s) of said lens to a solution of a water-soluble leuco ester of a vat dye whereby said dye penetrates said opaqued portion(s) of the lens and thereafter the dye is oxidized to regenerate the vat dye.

10. The method of claim 9 wherein the opaquing medium is a metal salt which undergoes reaction with a precipitating agent to provide a metallic opaquing material.

11. The method of claim 10 wherein the metal salt is silver nitrate, the precipitating medium is a halide salt and the precipitated silver halide is sensitive to light.

12. The method of claim 11 wherein the silver halide is silver chloride which, when exposed to light, provides metallic silver as the opaquing material.

13. The tinting method of claim 1 wherein tinting step (i) is carried out by exposing only the opaqued portion(s) of the lens to a solution of a water-soluble leuco ester of a vat dye whereby said dye penetrates said opaqued portion(s) of the lens and thereafter the dye is oxidized to regenerate the vat dye.

14. The tinting method of claim 2 wherein tinting step (i) is carried out by exposing the opaqued, unmasked portion(s) of the lens to a solution of a water-soluble leuco ester of a vat dye whereby said dye penetrates said opaqued, unmasked portion(s) of the lens and thereafter the dye is oxidized to regenerate the vat dye.

15. The tinting method of claim 2 wherein tinting step (i) is carried out by exposing the opaqued, unmasked portion(s) of the lens to a solution of a water-soluble leuco ester of a vat dye whereby said dye penetrates said opaqued, unmasked portion(s) of the lens and thereafter the dye is oxidized to regenerate the vat dye.

16. The tinting method of claim 5 wherein tinting step (i) is carried out by exposing the opaqued, unmasked portion(s) of the lens to a solution of a water-soluble leuco ester of a vat dye whereby said dye penetrates said opaqued, unmasked portion(s) of the lens and thereafter the dye is oxidized to regenerate the vat dye.

17. The tinting method of claim 6 wherein tinting step (i) is carried out by exposing the opaqued, unmasked portion(s) of the lens to a solution of a water-soluble leuco ester of a vat dye whereby said dye penetrates said opaqued, unmasked portion(s) of the lens and thereafter the dye is oxidized to regenerate the vat dye.

18. The tinting method of claim 9 wherein tinting step (i) is carried out by exposing the opaqued, unmasked portion) of the lens to a solution of a water-soluble leuco ester of a vat dye whereby said dye penetrates said opaqued, unmasked portion(s) of the lens and thereafter the dye is oxidized to regenerate the vat dye.

19. The tinting method of claim 10 wherein tinting step (i) is carried out by exposing the opaqued, unmasked portion(s) of the lens to a solution of a water-soluble leuco ester of a vat dye whereby said dye penetrates said opaqued, unmasked portion(s) of the lens and thereafter the dye is oxidized to regenerate the vat dye.

20. A selectively opaqued, tinted hydrogel contact lens wherein the visual effect of the tint is not appreciably influenced or modified by the color of the wearer's eyes produced by the method of claim 1.

21. The tinting method of claim 7 wherein tinting step (i) is carried out by exposing the opaqued, unmasked portion(s) of the lens to a solution of a water-soluble leuco ester of a vat dye whereby said dye penetrates said opaqued, unmasked portion(s) of the lens and thereafter the dye is oxidized to regenerate the vat dye.

22. The tinting method of claim 11 wherein tinting step (i) is carried out by exposing the opaqued, unmasked portion(s) of the lens to a solution of a water-soluble leuco ester of a vat dye whereby said dye penetrates said opaqued, unmasked portion(s) of the lens and thereafter the dye is oxidized to regenerate the vat dye.

23. The lens of claim 20 wherein opaquing is achieved by precipitating silver nitrate with a halide salt within selected portion(s) of the lens to provide light-sensitive silver halide which, when exposed to light, provides metallic silver as opaquing material.

* * * * *